United States Patent
Brown et al.

(10) Patent No.: US 10,520,132 B2
(45) Date of Patent: Dec. 31, 2019

(54) DEPLOYABLE PROP

(71) Applicant: River Front Services, Inc., Chantilly, VA (US)

(72) Inventors: Anthony M. Brown, Chantilly, VA (US); Donald R. Brown, Chantilly, VA (US); Thomas J. Harvey, Nederland, CO (US); Toby J. Harvey, Nederland, CO (US)

(73) Assignee: River Front Services, Inc., Chantilly, VA (US)

( * ) Notice: Subject to any disclaimer, the term of this patent is extended or adjusted under 35 U.S.C. 154(b) by 0 days.

(21) Appl. No.: 15/807,274

(22) Filed: Nov. 8, 2017

(65) Prior Publication Data

US 2018/0128419 A1 May 10, 2018

Related U.S. Application Data

(60) Provisional application No. 62/419,374, filed on Nov. 8, 2016.

(51) Int. Cl.
*F16M 11/40* (2006.01)

(52) U.S. Cl.
CPC .................. *F16M 11/40* (2013.01)

(58) Field of Classification Search
CPC ............................ F16M 11/10; F16M 11/40
USPC ............... 248/575, 599, 615, 622, 560, 351
See application file for complete search history.

(56) References Cited

U.S. PATENT DOCUMENTS

| | | | |
|---|---|---|---|
| 2,687,866 A * | 8/1954 | Johnson | F16B 7/14 248/168 |
| 2,911,910 A | 11/1959 | Welsh, Jr. | |
| 3,327,979 A * | 6/1967 | Hayama | F16M 11/40 248/166 |
| 3,431,574 A * | 3/1969 | Pierre | A46B 17/06 15/104.92 |
| 3,783,787 A | 1/1974 | Thornley et al. | |
| 4,499,828 A | 2/1985 | Honodel | |
| 4,813,358 A | 3/1989 | Roberts | |
| 4,856,430 A | 8/1989 | Gibb et al. | |
| 7,802,509 B2 | 9/2010 | Wall | |
| 7,819,063 B1 | 10/2010 | Lehman | |
| 7,926,423 B2 | 4/2011 | Rickman et al. | |

(Continued)

OTHER PUBLICATIONS

Gryphon Engineering Services, Gryphon Engineering | Folding Entry Prop Pole (4 Piece), web page as of Oct. 3, 2016.

(Continued)

*Primary Examiner* — Muhammad Ijaz
(74) *Attorney, Agent, or Firm* — Johnson, Marcou & Isaacs, LLC

(57) ABSTRACT

A deployable prop is provided that is capable of transitioning from an undeployed state to a deployed state in which the prop can be used to support an object against or adjacent to a structural surface. In one embodiment, the deployable prop includes a bistable "carpenter's" tape, a foot member that is engaged to one end of the tape, and a head member that is engaged to the other end of the tape. The tape, foot member, and head member can be placed in an undeployed state that has "roll" shape and in a deployed state in which the tape extends substantially linearly between the foot and head members and can be used to support an object against or adjacent to a structural surface.

19 Claims, 7 Drawing Sheets

(56) References Cited

U.S. PATENT DOCUMENTS

| | | | |
|---|---|---|---|
| 7,934,292 B2* | 5/2011 | Degner | F16M 11/10 |
| | | | 16/301 |
| 8,006,621 B1 | 8/2011 | Cherry | |
| 8,194,403 B2* | 6/2012 | Liu | F16M 11/046 |
| | | | 248/286.1 |
| 8,267,013 B2 | 9/2012 | Moore | |
| 8,826,821 B2 | 9/2014 | Martin | |
| 9,709,213 B2* | 7/2017 | Zheng | F16M 11/40 |
| 9,857,831 B2* | 1/2018 | Senatori | G06F 1/1616 |
| 2005/0092877 A1* | 5/2005 | Carnevali | F16M 11/40 |
| | | | 248/160 |
| 2005/0126420 A1 | 6/2005 | Givens et al. | |
| 2005/0179724 A1 | 8/2005 | Salt et al. | |
| 2011/0072956 A1 | 3/2011 | Wall | |
| 2011/0197779 A1* | 8/2011 | Moore | F42B 3/087 |
| | | | 102/331 |
| 2012/0073155 A1* | 3/2012 | Mabey | G01B 3/1005 |
| | | | 33/770 |
| 2012/0074291 A1* | 3/2012 | Fu | F16M 11/10 |
| | | | 248/560 |
| 2012/0106043 A1* | 5/2012 | Murakata | G06F 1/1626 |
| | | | 361/679.01 |
| 2012/0145027 A1 | 6/2012 | Martin | |
| 2014/0048672 A1 | 2/2014 | Woodruff et al. | |
| 2015/0008302 A1* | 1/2015 | Fan | F16M 11/10 |
| | | | 248/558 |
| 2015/0092427 A1* | 4/2015 | Nopper | F21S 6/003 |
| | | | 362/410 |
| 2015/0108313 A1* | 4/2015 | Leung | H05K 5/0204 |
| | | | 248/351 |
| 2015/0292672 A1* | 10/2015 | Dose | F16M 13/022 |
| | | | 361/679.56 |
| 2016/0134733 A1* | 5/2016 | Murphy | A45F 5/00 |
| | | | 455/575.6 |
| 2016/0226126 A1* | 8/2016 | Daton-Lovett | H01Q 1/087 |
| 2016/0286016 A1* | 9/2016 | Lee | H04M 1/04 |
| 2017/0223862 A1* | 8/2017 | Justiss | F16M 11/10 |
| 2018/0128419 A1* | 5/2018 | Brown | F16M 11/40 |
| 2019/0103650 A1* | 4/2019 | Daton-Lovett | H01Q 1/087 |

OTHER PUBLICATIONS

Ensign-Bickford Aerospace & Defense, Rapid Wall Breaching Kit, web page as of Oct. 3, 2016.

International Search Report and Written Opinion PCT/US2017/060685.

Notification of Transmittal of International Preliminary Report on Patentability (Chapter II of the Patent Cooperation Treaty) and International Preliminary Report on Patentability (Chapter II of the Patent Cooperation Treaty) for PCT/US2017/060685, dated Oct. 19, 2018.

Notification of Transmittal of International Preliminary Report on Patentability (Chapter II of the Patent Cooperation Treaty), International Preliminary Report on Patentability (Chapter II of the Patent Cooperation Treaty), and Communication in Cases for Which No Other Form is Applicable for PCT/US2017/060685, dated Dec. 3, 2018.

* cited by examiner

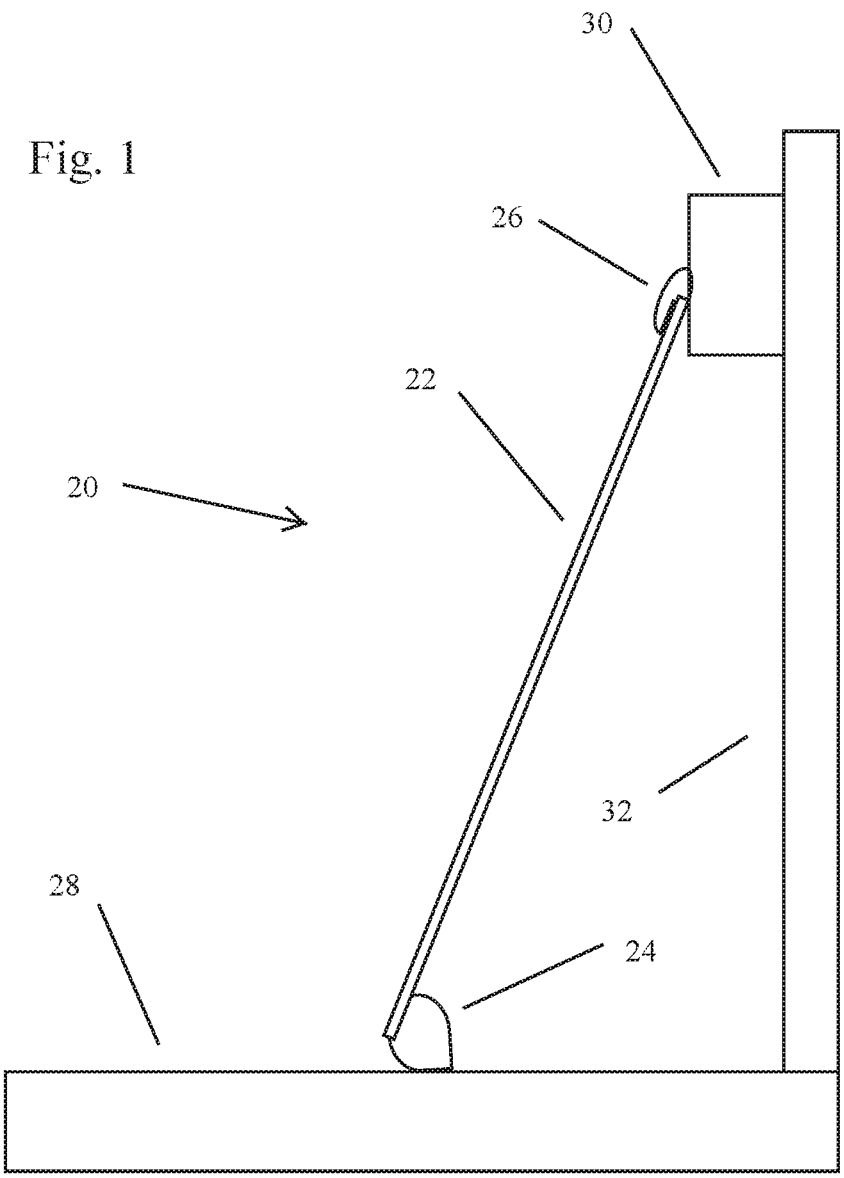

Fig. 2A
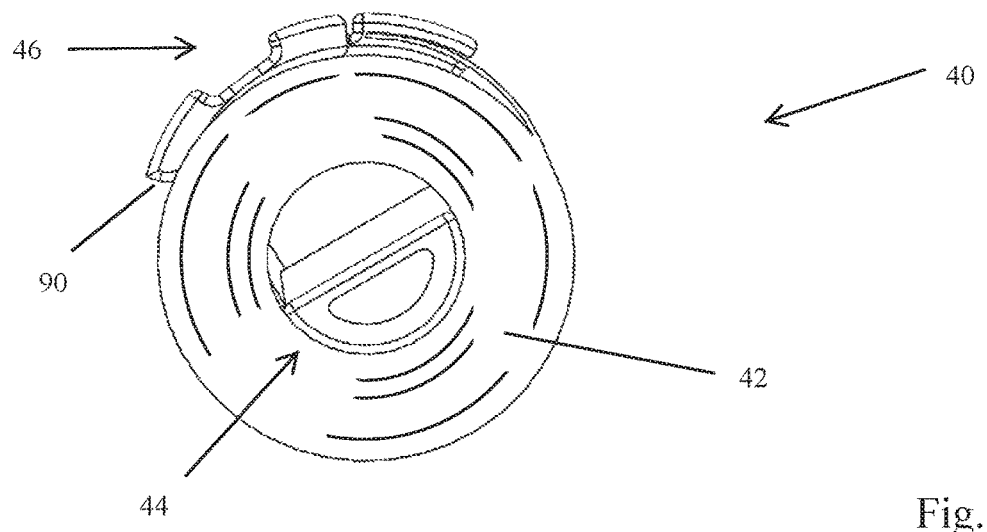
Fig. 2B
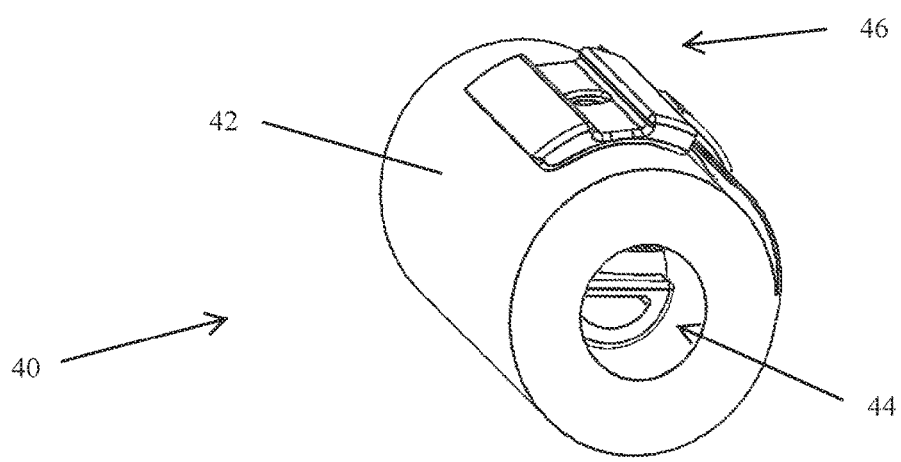
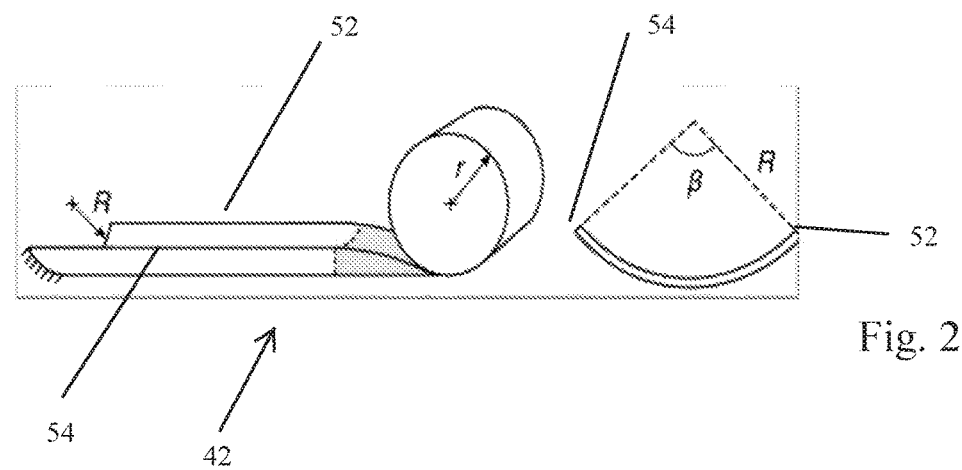
Fig. 2C

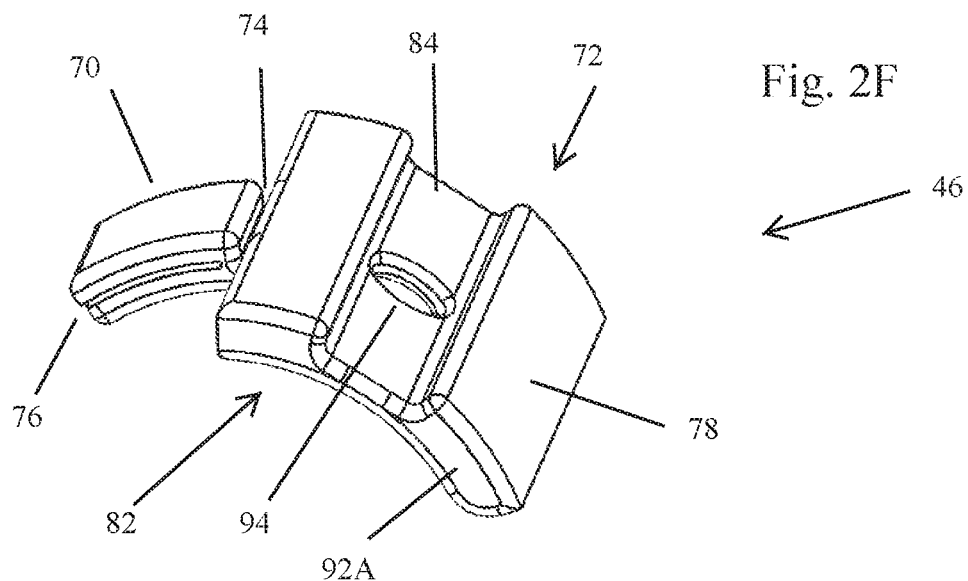
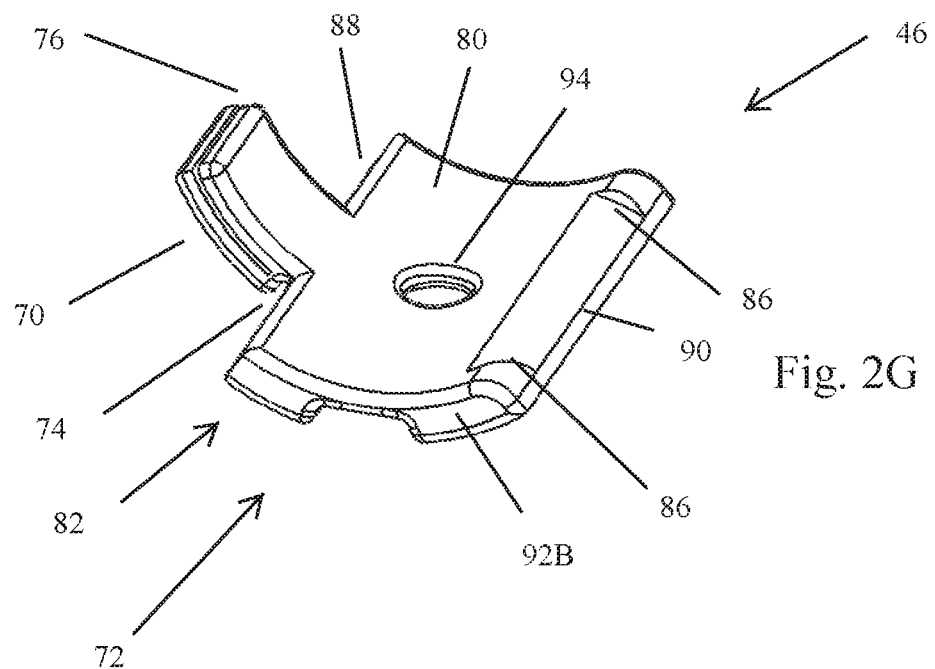

US 10,520,132 B2

DEPLOYABLE PROP

CROSS-REFERENCE TO RELATED APPLICATIONS

The present application claims the benefit of U.S. provisional patent application No. 62/419,374 entitled "DEPLOYABLE PROP" and filed on Nov. 8, 2016, which is incorporated herein by reference in its entirety.

FIELD OF THE INVENTION

The invention relates to a deployable prop that is capable of transitioning from an undeployed state to a deployed state in which the prop takes on the characteristics of a column-like structure and is adapted to support an object at a desired location adjacent to a surface.

BACKGROUND OF THE INVENTION

Generally, there is a need to support an object a desired distance above ground level and against or adjacent to a vertically extending structure (e.g. door, window, wall etc.), horizontally extending structure (e.g., ceiling, roof, overhead beam etc.), or other structural surface. To address this need, props have been developed that can generally be characterized as having a foot end, head end, and a beam extending between the foot and head ends. In use, the foot end of the prop engages the ground or other supporting surface and the head end engages the object of interest that is positioned against or adjacent to a structural surface at a desired distance above the supporting surface such that, but for the support provided by the prop, the object would fall towards the supporting surface.

Various types of props have been developed. One type of prop is a fixed length prop that is made of a single-piece of wood, metal tubing, PVC pipe, or other suitable material. Characteristic of single-piece props is their fixed dimensions (typically, 1.2-1.8 m in length and 2.5-5.0 cm in diameter) and/or weight (typically, 0.5-1.0 kg). A second type of prop is a deployable prop that is adapted to transition from an undeployed state to a deployed state in which the prop is capable of supporting an object of interest against or adjacent to a structural surface. Among the second type of props are sectioned props in which each section of the prop can be joined to at least one other section, folding props that employ a shock/bungee cord to connect a number of sections of tubing to one another (i.e., a "tent pole" prop), telescoping props, and inflatable props. Sectioned and folding props each typically occupy the same or approximately the same total volume whether in the undeployed or deployed state. However, the volume occupied by such props in the undeployed state typically facilitates the use of the prop in applications in which the prop needs to be transported from one location to another location. Telescoping props and inflatable props typically occupy a smaller volume in the undeployed state than in the deployed state. This smaller volume also facilitates the use of such props in applications in which the prop needs to be transported between locations.

SUMMARY OF THE INVENTION

The invention is directed to a deployable prop that occupies a smaller volume when in the undeployed state than in the deployed state and, it is believed, has a considerably lower mass than existing props that have a comparable length in the deployed state. In one embodiment, the deployable prop comprises a tape (typically referred to as a "carpenter's tape") and one of: (a) a foot member that is operatively engaged to one end of the tape and (b) a head member that is operatively engaged to the other end of the tape. Characteristic of a carpenter's tape is that in the deployed state the tape extends linearly and has a transverse curve over the deployed length of the tape that gives the deployed tape beam-like characteristics which allow the tape to be supported at one end and extend a considerable distance to a free or unsupported end. Also characteristic of a carpenter's tape is that the tape can be rolled from one end to the other end with the rolling resulting in the transverse curve in the tape being removed as the rolling operation progresses. In the undeployed state, the tape has a rolled shape, like a roll of paper towels. In the fully deployed state, the tape extends substantially linearly between the ends of the tape. When the deployed prop is used to support an object of interest against or adjacent to a structural surface, one end of the tape and any foot member is positioned to engage a ground surface, the other end of the tape and any head member is positioned to engage the object of interest that is positioned at a desired location adjacent to a surface, and the tape extends in a substantially linear fashion between the ends of the tape. In another embodiment, the deployable prop includes a tape, a head member operatively engaged to one end of the tape, and a foot member operatively engaged to the other end of the tape.

In a particular embodiment of the deployable prop, the carpenter's tape is a bistable carpenter's tape made from a carbon fiber composite, fiberglass, or other suitable material. The two states in which the tape is stable are: (a) when substantially the entire tape is disposed in a roll (i.e., the undeployed state) and (b) when substantially the entire tape extends linearly (i.e., the deployed state). If the tape is in a state between these two stable states (i.e., a portion of the tape is rolled up and a portion of the tape extends linearly or is partially deployed), the energy stored in the tape is automatically applied to transition the tape towards one of the two stable states. Since one of the two stable states of the tape is associated with the prop being in the undeployed state, this embodiment of the deployable prop avoids the need for any kind of restraining device to maintain the tape in the rolled or undeployed state, as would be required with a carpenter's tape that is not bistable.

In another embodiment of the deployable prop, the head member is attached to an end of the tape and includes a "deployment switch," i.e., a structure that when moved to a deploy position causes a portion of the tape adjacent to head member to transition from being rolled to being straight. In an embodiment that employs a bistable tape, this transition of the portion of tape adjacent to the head member from being rolled to being straight places the tape in or near an unstable state that causes the tape to self-deploy towards the stable state in which the tape is fully deployed, i.e., extends substantially linearly throughout the entire length of the tape.

In yet a further embodiment of the deployable prop, the head member includes a "cap" structure that operatively covers the end of the tape to which head member is attached, thereby preventing the end of the tape from being engaged by other structures (e.g., the object of interest or the structure adjacent to which the object is being supported by the prop) in a manner that could apply a force to the tape which could potentially compromise the structural integrity of the tape when the prop is in the deployed state. In yet a further embodiment, the head member includes a cap structure that prevents undesired contact with other structures and supports the end of the tape in a manner that prevents the end of the tape from being deformed, i.e., preventing the transverse curve associated with the end of the tape from being deformed and potentially compromising the integrity of the tape.

In another embodiment of the deployable prop, the foot member includes a structure with a partially cylindrical surface that allows the prop to be positioned at different angles to the ground surface. Further, in a specific embodiment, the cylindrical surface facilitates the placement of the prop in the undeployed state by having a radius that is slightly smaller than the radius of the innermost winding of the tape. As such, the tape can be readily wound around the foot member to place the prop in the undeployed state.

In yet a further embodiment of the deployable prop, the foot member supports the tape such that the neutral axis of the deployed tape intersects the centroid/center of mass of the foot member. This increases the strength of the prop, i.e., increases the mass that can be supported by the deployed prop.

Another embodiment of the deployable prop, the foot member includes a tape stabilizer that engages the interior side of the end of the tape to which the foot member is attached and serves to support the deployed tape in a manner that prevents rotation of the deployed tape about its long axis, which could compromise the integrity of the tape.

In a further embodiment of the deployable prop, the lateral edges of the tape are covered in a sheath of tape or elastomeric material that is capable of accommodating the change in shape of the tape between the undeployed and deployed states. The sheath prevents the small slivers of material that are shed by some tape materials (e.g., carbon fiber) from penetrating a user's hand. In some embodiments, the tape or elastomeric material sheaths the lateral edges of the tape and top and bottom surfaces of the tape that extend between the lateral edges of the tape. In another embodiment, the tape or elastomeric material covers the end edges of the tape. In this embodiment, the tape or elastomer covering the end edges also forms head and/or foot members of the deployable prop. In this embodiment, the tape or elastomer has sufficient frictional properties to engage at least certain ground surfaces and certain objects so that the object can be supported as desired location against or adjacent to a surface. In one embodiment, a liquid elastomer is applied to an end of the tape (e.g., by dipping) and allowed to cure to form the head or foot member of the prop. If needed or desired, multiple coatings of the elastomer can be applied to an end of the tape to build up the bulk of the head or foot member.

Also provided is a method of supporting an object of interest adjacent to or against a structural surface with a prop. The method includes providing a deployable prop that includes a carpenter's tape in a rolled or undeployed state, causing the carpenter's tape to deploy such that the tape extends linearly from the first terminal end of the tape to the second terminal end of the tape, positioning the first end of the tape so as to operatively engage a ground surface, and positioning the second end of the tape so as to operatively engage the object of interest where the object of interest is positioned at a desired location against or adjacent to a surface. Use of the method results in the tape extending between the ground surface and the object of interest such that the object of interest is held in a stable position adjacent to or against a structural surface. In one embodiment, the method employs a deployable prop that includes foot and head members that are respectively attached to opposite ends of the tape so as to form an integrated structure that can be placed in an undeployed state characterized by the tape being in a rolled state. In another embodiment, one or both of the foot and head members is/are attached to the tape after deployment, thereby allowing the foot and/or head members that accommodate particular applications to be attached to the tape. In yet a further embodiment, the deployable prop does not employ a head member because the object of interest is adapted or has been adapted to receive an end of the tape and support the tape in a desired manner. In another embodiment of the method, the deployable prop does not employ a foot member because the ground surface that will support the prop may sufficiently support the prop without the need for a foot member. For example, a firm "mud" may support the tape the desired manner. One application in which the deployable prop is utilized is as a prop to support an explosive charge against a surface in which it is desirable to establish a breach.

BRIEF DESCRIPTION OF THE DRAWINGS

FIG. 1 is a schematic view of an embodiment of a deployable prop in a deployed state and supporting an object against a wall;

FIGS. 2A and 2B respectively are a side view and a perspective view of a second embodiment of a deployable prop;

FIG. 2C illustrates the bistable "carpenter's" tape employed in the embodiment of the deployable prop shown in FIGS. 2A and 2B in a partially deployed and partially undeployed state and the transverse curve associated with the deployed state of the tape;

FIG. 2F is a perspective view of the outer side of the head member of the embodiment of the deployable prop shown in FIGS. 2A and 2B;

FIG. 2G is a perspective view of the inner side of the head member of the embodiment of the deployable prop shown in FIGS. 2A and 2B;

DETAILED DESCRIPTION

Figure 2D:
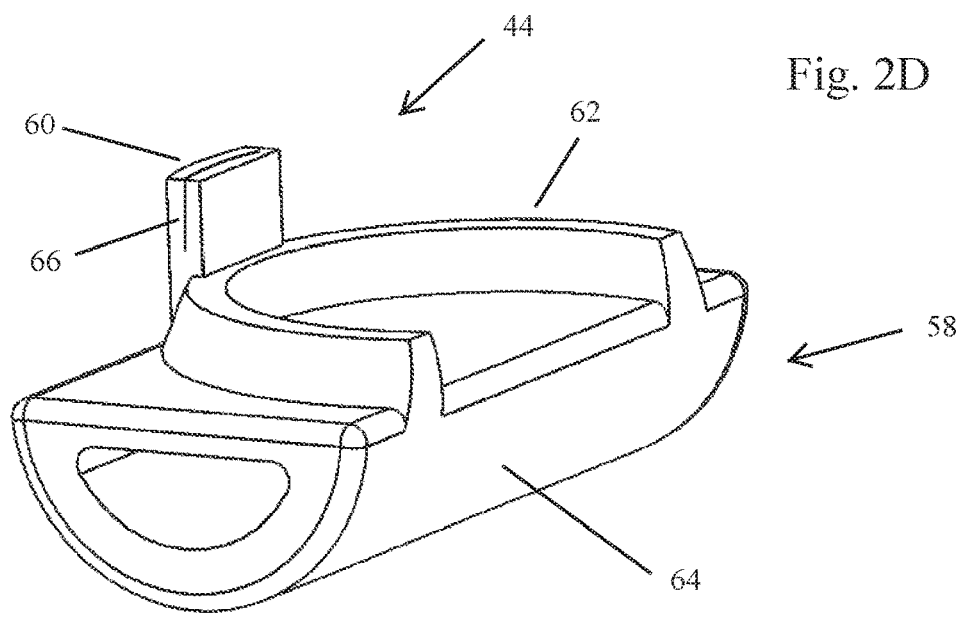
FIG. 2D is a perspective view of the foot member of the embodiment of the deployable prop shown in FIGS. 2A and 2B.

With reference to FIG. 1, an embodiment of a deployable prop 20 is described. Generally, the deployable prop 20 comprises a tape 22, a foot member 24, and a head member 26. The tape 22 is capable of being placed in a deployed state and an undeployed state. Characteristic of the deployed state is that the tape extends linearly between its terminal ends and has a transverse curve between its lateral edges over substantially the entire length of the deployed tape. Characteristic of the undeployed tape is that the tape is disposed in an Archimedean spiral that extends between its terminal ends and there is substantially no transverse curve between the lateral edges of the tape. It should be appreciated that the tape can be placed in other undeployed states. For instance, the tape can be disposed so as to follow a serpentine path. However, characteristics of any undeployed state is that the terminal ends of the tape are closer to one another in the undeployed state than in the deployed state. In operation, the deployable prop 20 is transitioned from the undeployed state to the deployed state, the foot member 24 is placed into contact with a ground surface 28, and the head member 26 is positioned to contact with the object 30 so as to support the object at a desired location adjacent to a vertically extending surface 32. It should be appreciated that the ground surface 28 and vertically extending surface 32 need not be perpendicular to one another and need not be planar surfaces.

With reference to FIGS. 2A-2I, a second embodiment of a deployable prop 40 is described. The prop 40 includes a tape 42, a foot member 44, and a head member 46. In the illustrated embodiment, the tape 42 is a bistable "carpenter's" tape that has two stable states, a deployed state and an undeployed state. Characteristic of the deployed state is that the tape 42 extends substantially linearly from a first terminal end 48 to a second terminal end 50. In the illustrated embodiment, the length of the tape (i.e., distance from the first terminal end 48 to the second terminal end 50) is 5 ft. or about 1.52 m. A tape with greater or lesser length depending on the application and other physical characteristics of the prop is feasible. Also characteristic of the deployed state is that the tape 42 has a transverse curve between a first lateral edge 52 and a second lateral edge 54 that is present over substantially the entire length of the tape. The transverse curve in the illustrated embodiment is a circular curve that has an angular extent of about 265°. The transverse curve can have a greater or lesser angular extent depending on the application and other physical characteristics of the prop is feasible. In the deployed state, the tape takes on the characteristics of a beam. Characteristic of the undeployed state is that the tape 42 is disposed in a roll (Archimedean spiral) in which the transverse curve present in the deployed state is no longer present. In the undeployed state, the width of the tape (i.e., the perpendicular distance between the first lateral edge 52 and the second lateral edge 54) is 2.5 inches or about 6.35 cm. A tape with greater or lesser width depending on the application and other physical characteristics of the prop is feasible is feasible. Characteristic of the bistable nature of the tape 42 is that, if the tape is in a state that is between the deployed and undeployed states, potential energy stored in the tape is applied and causes the tape to transition towards one of the two stable states. In the illustrated embodiment, the bistable carpenter's tape 42 is designed so that if a substantial portion of the tape is in the undeployed state and a small portion of tape adjacent the outermost terminal end of the tape is placed in a deployed tape, the tape transitions towards the deployed state. In the illustrated embodiment, the bistable carpenter's tape 42 is made from carbon fiber. However, bistable carpenter's tapes can also be made from fiberglass, Kevlar™ fiber, or other composite materials. Bistable tapes are well known in the art and can be obtained from various manufacturers with the desired physical characteristics (e.g., length, width, angular extent of transverse curve, and point/ range over which the tape will transition towards one of the two stable states etc.). Among these manufacturers are RTL Materials Ltd., LoadPath, and Roccor, Inc.

Figure 2E:
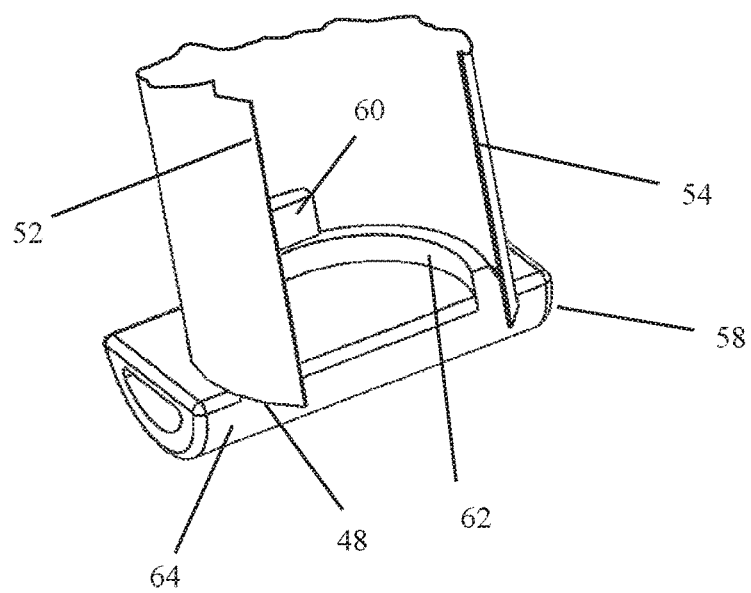
FIG. 2E is a perspective view of the foot member and the tape of the embodiment of the deployable prop shown in FIGS. 2A and 2B when the portion of the tape engaging the foot member is in a deployed state.

With reference to FIGS. 2D and 2E, the foot member 44 comprises a ground engagement portion 58, an attachment tab 60, and a tape stabilizer portion 62. The ground engagement portion 58 has an outer surface 64 that has a partial-cylinder shape. The partial-cylinder shape, when in contact with flat ground, ensures that a portion of the ground engagement portion 58 is in contact with the ground over a substantial range of angles that the deployable prop might have relative to the ground. It should be appreciated that the ground does not necessarily need to be flat for the ground engagement portion 58 of the deployable prop to function. Further, it should also be appreciated that the "ground" need not be a horizontal surface but can be any surface that allows the deployable prop 40, when deployed, to hold an object against or adjacent to another surface. The ground engagement portion 58 is also preferably made of a thermoplastic elastomer that has a relatively high coefficient of friction that prevents slippage between the ground engagement portion 58 and the ground when the deployed prop is supporting an object adjacent to or against a surface. Materials with sufficient coefficients of friction other than a thermoplastic elastomer are also feasible.

The attachment tab 60 is operatively attached to ground engagement portion 58 and tape stabilizer portion 62 of the foot member 44 and has a slit 66 for receiving a portion of the first terminal end 48 of the tape 42. A bonding material is used to engage the attachment tab 60 and the tape 42 to one another. The attachment tab 60 is flexible so as to conform to the shape of the tape 42 when the tape is in the deployed and undeployed states. In the illustrated embodiment, the attachment tab 60 is made of a thermoplastic elastomer. Other materials that accommodate the change in shape of the tape 42 between the undeployed and deployed states are feasible. Further, the bonding material used to connect the attachment tab 60 and tape 42 to one another accommodates the change in the shape of the portion of the tape 42 engaged by the attachment tab 60 when the tape transitions between undeployed and deployed states.

The tape stabilizer 62 is operatively attached to the ground engagement portion 58 and attachment tab 60 and operates so as to engage the interior surface side of the tape adjacent to the first terminal end 48 of the tape 42 when the tape is in the deployed state. The tape stabilizer 62 prevents the cross-section of the tape 42 at the end of the tape from deforming while under load. The tape stabilizer 62 is made of a thermoplastic elastomer. However, the tape stabilizer can be made of other materials.

In the illustrated embodiment, the foot member 44 is a monolithic structure made from a thermoplastic elastomer and formed by casting, molding, 3D printing, or other method known to those in the art. As such, the ground engagement portion 58, attachment tab 60, and tape stabilizer portion 62 are all made from the same thermoplastic elastomer. The foot member can be formed from multiple pieces that are operatively joined to one another and/or from different materials, if needed or desired. For example, the ground engagement portion 58 can be a two-piece structure, a substrate and a partially cylindrical coating of a material with a suitable coefficient of friction. Further, because the tape stabilizer portion 62 does not need to accommodate changes in the shape of the tape between the undeployed and deployed states, the tape stabilizer portion 62 can be made of a material with a low coefficient of friction (e.g., a plastic or a metal) and fastened or bonded to the ground engagement portion 58.

Substantially the entire foot member 44 (other than a small portion of the attachment tab) is disposed within an inner space defined by the tape 42 when the tape is in the undeployed state. In this regard, the partial-cylinder shape of the outer surface of the ground engagement portion 58 has a radius that is slightly less than the inner radius of the Archimedean spiral defined by the tape 42 when the tape is in the undeployed state. Further, the tape stabilizer 62 is attached to the ground engagement portion 58 and located substantially within the space that would be occupied by the ground engagement portion 58 if the ground engagement portion was a full cylinder. The attachment tab 60 is flexible and bends so as to accommodate the tape 42 being in the undeployed state and, as such, is also substantially disposed within the space defined by the ground engagement portion 58 if the ground engagement portion was a full cylinder. As such, the foot member 44 acts as frame around which the tape 42 can be wound when in the undeployed state.

With reference to FIGS. 2F-2G, the head member 46 comprises an attachment tab 70, a cap 72, and a flex hinge 74 connecting the attachment tab and the cap. The attachment tab 70 has a slit 76 for receiving a portion of the second terminal end 50 of the tape 42. A bonding material is used to engage the attachment portion 70 and the tape 42 to one another. The attachment tab 70 is flexible so as to conform to the change in shape of the tape 42 between the deployed and undeployed states. Further, the bonding material used to connect the attachment tab 70 and tape 42 to one another accommodates the change in the shape of the portion of the tape engaged by the attachment tab when the tape transitions between undeployed and deployed states. The attachment tab 70 is also made of a thermoplastic elastomer.

Generally, the cap 72 is a cylindrical section with an outer surface 78 and an inner surface 80 that is separated from the outer surface by a side surface 82. Generally, the outer surface 78 has the shape of a cylindrical section but for a lanyard groove 84 that can accommodate a lanyard, strap, or edge of an object that may be supported by the prop 40 when deployed. Generally, the inner surface 80 has the shape of a cylindrical section with a radius that is just slightly greater than the outer radius of the tape when in the tape is in the undeployed state. Associated with the inner surface 80 is a groove 86 that is dimensioned to engage the outside surface of the second terminal end 50 of tape 42 when the tape is deployed and thereby prevent the tape from being distorted in a manner that might compromise the integrity of the tape and cause the deployed prop to fail. The side surface 82 includes a hinge surface 88 that engages the hinge 74 which connects the cap 72 and the attachment tab 70, a thumb tab surface 90 opposite the hinge surface 88, and two side edge surfaces 92A, 92B that each extend between the hinge surface 88 and the thumb tab surface 90. A hole 94 extends between the outer surface 78 and inner surface 80. The hole 94 can be used to accommodate a lanyard, strap, or other structure associated with an object to be supported by the deployed prop. It should be appreciated that, while the lanyard groove 84 and hole 94 are structures that may facilitate the ability of the deployed prop to support certain types of objects, the cap 72 can be adapted to support other structures that facilitate the ability of the deployed prop to support other types of objects. For example, the cap 72 could be adapted to accommodate a snap or barb fastener. The cap 72 is also made of a thermoplastic elastomer with a suitable coefficient friction for engaging the object that is to be supported against or adjacent to a particular surface by the prop 42. The flex hinge 74 is also made of a thermoplastic elastomer.

In the illustrated embodiment, the head member 46 is a monolithic structure made from a thermoplastic elastomer and formed by casting, molding, 3D printing, or other method known to those in the art. As such, the attachment tab 70, cap 72, and flex hinge 74 are all made from the same thermoplastic elastomer material. The head member 46 can also formed from multiple pieces that are operatively joined to one another and from different materials if needed or desired. For example, the attachment tab 70, cap 72, and flex hinge 74 can be separate pieces with the flex hinge 74 joining the attachment tab 70 to the cap 72.

With reference to FIG. 2A, when the deployable prop 40 is in the undeployed state, the head member 46 generally conforms to the outer radius of the undeployed tape 42. The attachment tab 70, cap 72, and flex hinge 74 cooperate to allow an operator to readily deploy the prop. To elaborate, an operator can initiate deployment of the prop 42 by using their thumb or other object to displace the cap 72 away from the tape 42, typically by engaging the thumb tab surface 90. This displacement, in turn, causes a portion of the tape 42 adjacent to the second terminal end 50 of the tape to which the attachment tab 70 is connected to be displaced away from the remainder of the tape such that the displaced portion of the tape extends linearly and has a transverse curve. It should be appreciated that the flex hinge 74 allows the cap 72 to rotate relative to the attachment tab 70 so as to transition between the positions shown in FIG. 2H and FIG. 2I. However, the flex hinge 74 and surfaces of the attachment tab 70 and cap 72 adjacent to the flex hinge 74 prevent rotation of the cap 72 away from the second terminal end 50 of the tape beyond that shown in FIGS. 2A, 2B, and 2H. As such, the application of a user's thumb to flick the cap 72 away from the tape 42 causes a portion of the tape adjacent to the cap to deploy. Due to the bistable nature of the tape 42, the displacement of the end portion of the tape causes the remainder of the tape to self-deploy (i.e., extend linearly and have a curved transverse cross-section throughout the length of the tape) or places the tape closer to the point at which the tape will self-deploy.

Figure 2H:
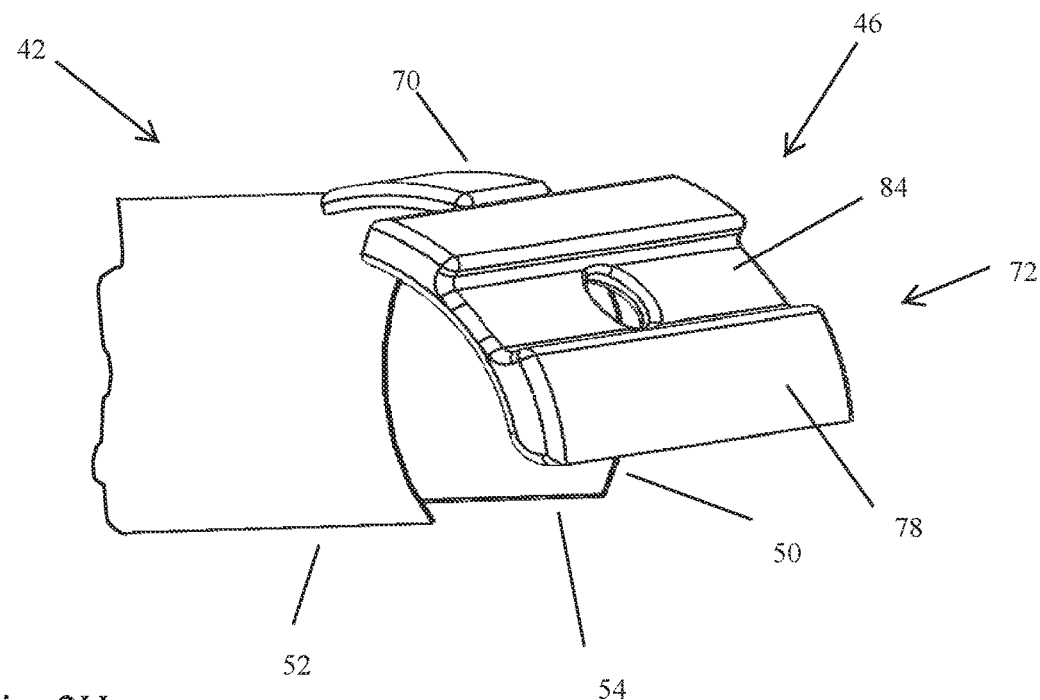
FIG. 2H is a perspective view of the tape and the head member of the embodiment of the deployable prop shown in FIGS. 2A and 2B with the cap of the head member displaced from the tape.
Figure 2I:
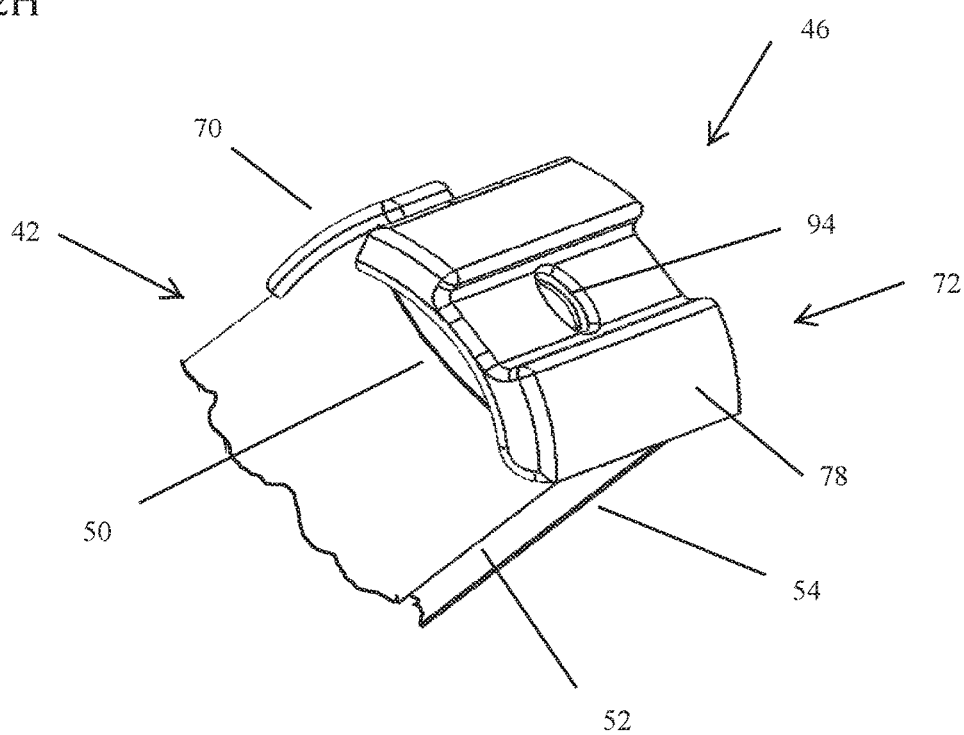
FIG. 2I is a perspective view of the tape and the head member of the embodiment of the deployable prop shown in FIGS. 2A and 2B with the cap of the head member operatively engaged to the tape.

After the tape 42 is fully deployed, the cap 72 serves a number of purposes. With reference to FIGS. 2G and 2H, the cap 72 is brought into engagement with the second terminal end 50 of the tape 42 to protect the tape from being engaged by the wall, object to be supported by the prop, or other surface in a way that could compromise the structural integrity of the tape, i.e., cause the tape to fail. Further, the groove 86 on the inner surface 80 of the cap 72 receives the second terminal end 50 of the tape and operates to maintain the shape of the tape, thereby preventing the shape of the tape from being changed in a manner that could compromise the structural integrity of the tape.

The lanyard groove 84 and/or the hole 90 may be employed to facilitate support of those types of objects that can make use of the groove and/or hole to facilitate their support, including objects with which a lanyard or strap can be associated and objects with an appropriate engagement structure (e.g., an edge that can be accommodated in the groove or dowel that can be accommodated in the hole).

Deployment of the deployable prop 40 from the undeployed state (FIG. 2A) to a deployed state commence with displacing the cap 72 away from the outermost winding of the tape 42. This can be done by using one's thumb to engage the thumb tab 90 to displace the cap 72 away from the tape. Displacement of the cap 72 away from the tape 42 causes a portion of the tape to transition to the deployed state. Due to the bistable nature of the tape 42, once a sufficient length of the tape has transitioned to the deployed state, the remainder of the tape will self-deploy. Once the tape 42 is fully deployed, the foot member 44 can be brought into engagement with a supporting surface and the cap 72 can be brought into engagement with the second terminal end 50 of the tape and the object that is to be supported against or adjacent to a surface, as shown in FIG. 1.

Figure 3A:
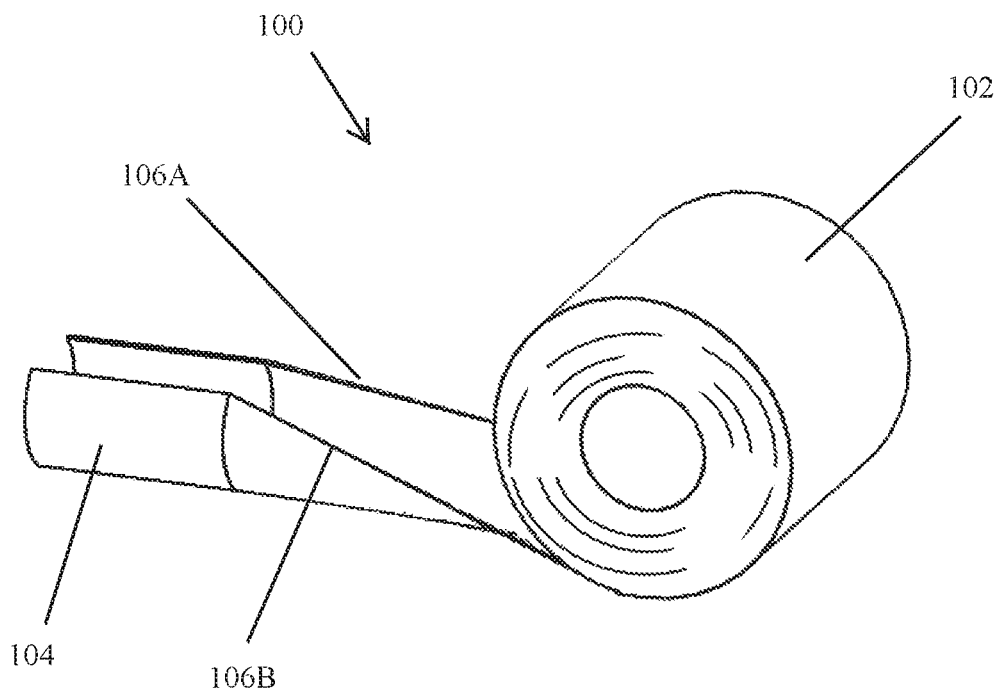
FIG. 3A illustrates a third embodiment of the deployable prop in a partially deployed state.
Figure 3B:
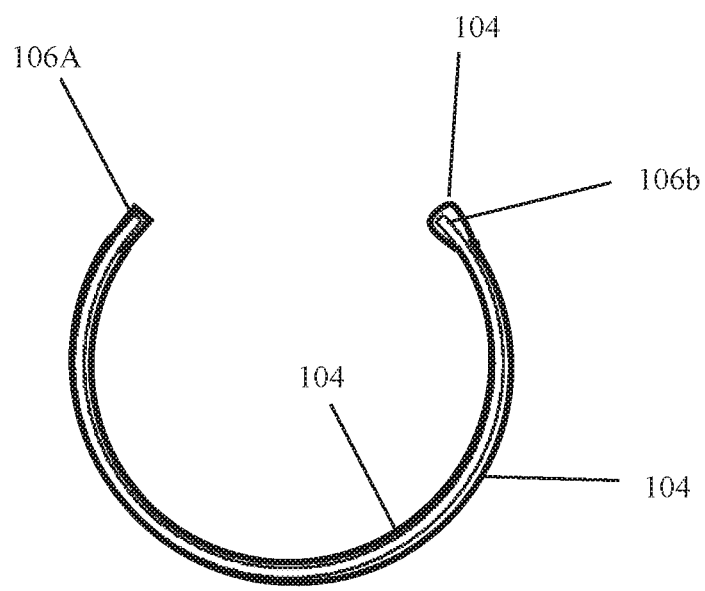
FIG. 3B is an end view of the head member of the deployable prop shown in FIG. 3A.
Figure 3C:
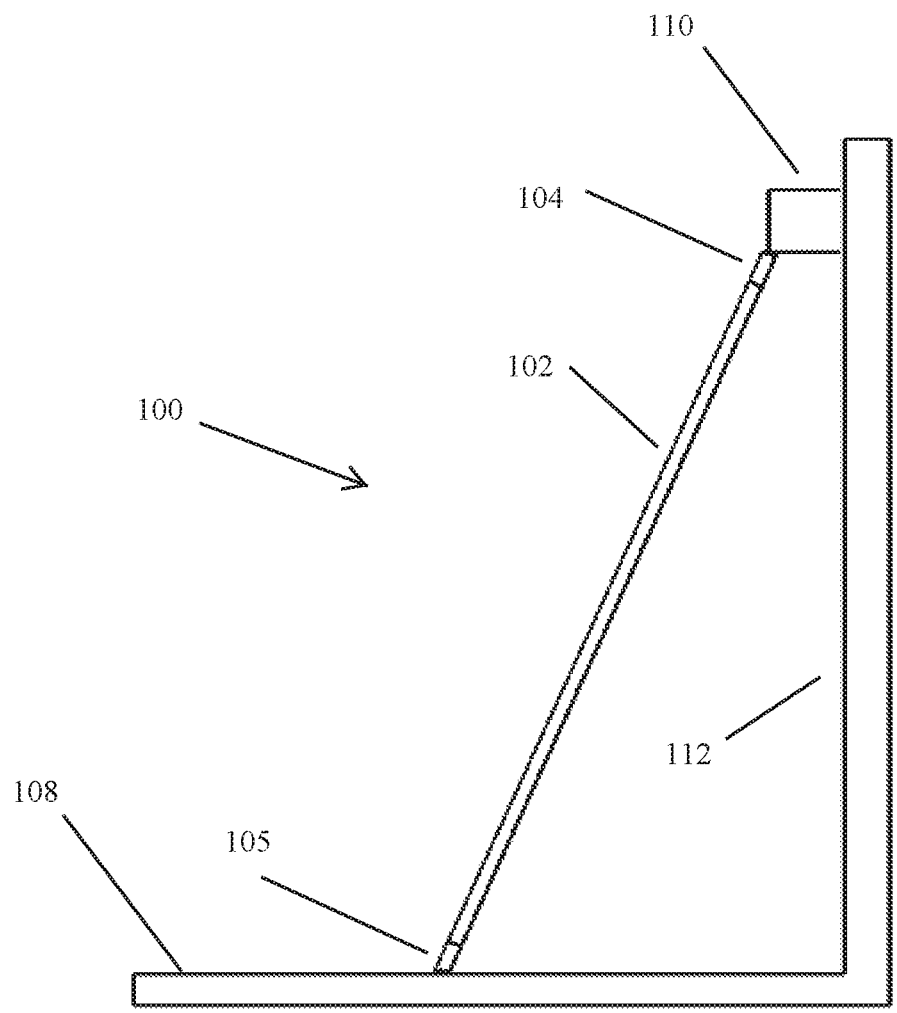
FIG. 3C illustrates an exemplary use of the deployable prop shown in FIGS. 3A and 3B.

With reference to FIGS. 3A-3C, a third embodiment of a deployable prop 100 is discussed. The prop 100 includes a tape 102, a head member 104 attached to one end of the tape, and a foot member 105 that is attached to the other end of the tape. The tape 102 is preferably a bistable tape. The head member 104 is a thermoplastic elastomer that is applied to the end of the tape by dipping, spraying, painting, or other application technique. To increase the bulk of the head member 104, multiple coats of the thermoplastic elastomer can be applied to the end of the tape. Alternatively, parachute tape (an adhesive tape with a canvas-like exterior surface that is elastic enough to accommodate the change in shape of the tape 102 between the undeployed and deployed states) can be used to realize the head member. To increase the bulk of the head member 104 multiple layers of the parachute tape can be applied. Other materials that exhibit an exterior surface with adequate frictional properties, the ability to adhere or be adhered to the tape 102, and can accommodate the changes in shape of the tape between the undeployed and deployed states can be employed. Typically, the foot member is substantially identical to the head member 104. However, if needed or desired, the head member 104 and the foot member can be made from different materials or different combinations of materials and/or have different bulks. For example, the head member 104 can be a relatively thin layer of a thermoplastic elastomer and the foot member can be bulky structure realized with several layers of parachute tape.

As shown in FIG. 3A, the head member 104 covers portions of lateral edges 106A, 106B of the tape. Covering the lateral edges 108A, 108B has been found to be particularly beneficial when the tape 102 is made of carbon fiber or other material that has a tendency to shed small slivers of material that can penetrate a user's hand and cause substantial irritation. As such, in certain embodiments, the material used to realize the head member 104 and/or foot member is also applied so as to cover the remaining portions of the lateral edges 108A, 108B. In some embodiments in which the material that is used to cover the remaining portions of the lateral edges 108A, 108B is applied by spraying, dipping, or similar process, the entire tape 102 is covered in the material. It should be appreciated that the material used to cover the remaining portions of the lateral edges 108A, 108B or the entire tape other than the head member 104 and foot member can be a different material than the material/materials used to realize the head member 104 and foot member 105. For instance, the head member 104 and foot member may each be made from a thermoplastic elastomer and the remainder of the tape can be covered in parachute tape.

Deployment of the prop 100 from the undeployed state (in an Archimedean spiral) commences with displacing the head member 104 away from the remainder of the tape so as to cause a portion of the tape 102 to transition from the undeployed state to the deployed state. After a sufficient length of the tape 102 has transitioned to the deployed state, the bistable nature of the tape causes the remainder of the tape to self-deploy. As shown in FIG. 3C, once the prop 100 is fully deployed, the prop is positioned relative to a support surface 108, an object 110, and a vertically extending surface 112 so as to support the object at a desired location adjacent to the surface 112. With respect to the prop 100, it should be appreciated that the portion of the prop identified as the head member 104 and positioned adjacent to the outermost winding of the tape 102 when the prop is in the undeployed state could be the foot member and the head member could be positioned adjacent to the innermost winding of the tape 102 when the prop is in the undeployed state.

While the deployable prop 40 and the deployable prop 100 have been described as utilizing bistable tapes, it should be appreciated that a tape which is not bistable could be utilized. However, the use of such a tape would likely require a restraining structure to hold the tape in the undeployed state and that could be readily removed to allow the tape to deploy.

The foregoing description of the invention is intended to explain the best mode known of practicing the invention and to enable others skilled in the art to utilize the invention in various embodiments and with the various modifications required by their particular applications or uses of the invention.

What is claimed is:

1. A deployable prop for use in supporting an object at a desired location adjacent to a vertically extending surface, comprising:
   a tape that extends from a first terminal end to a second terminal end and between a first lateral edge and a second lateral edge that is substantially parallel to the first lateral edge;
   wherein the tape has a deployed state and an undeployed state;
   wherein, when the tape is in the undeployed state, the first lateral edge is separated from the second lateral edge by a first lateral edge distance over a substantial length of the tape, the first terminal end is separated from the second terminal end by a first terminal end distance, the tape follows an Archimedean spiral with the first terminal end of the tape defining an interior end of the Archimedean spiral, the second terminal end of the tape defining an exterior end of the Archimedean spiral, an innermost winding of the tape has an inner radius, and an outermost winding of the tape has an outer radius;
   wherein, when the tape is in the deployed state, the first lateral edge is separated from the second lateral edge by a second lateral edge distance that is less than the first lateral edge distance over the substantial length of the tape, the first terminal end of the tape is separated from the second terminal end of the tape by a second terminal end distance that is greater than the first terminal end distance, the tape extends substantially linearly from the first terminal end to the second terminal end, and a transverse curve is established over the substantial length of the tape; and
   a head member operatively attached adjacent to the second terminal end of the tape, the head member comprising a partially cylindrical head member surface that is disposed immediately adjacent to a portion of the tape that is spaced from the second terminal end of the tape when the tape is in the Archimedean spiral associated with the undeployed state, wherein the head member comprises an attachment structure with a surface that engages the tape, a cap, and a hinge connecting the attachment structure and the cap and allows the cap to rotate relative to the attachment structure so as to contact the second terminal end of the tape, the hinge having a rotational axis that is: (a) substantially perpendicular to at least one of the first and second lateral edges of the tape and (b) substantially parallel to a plane defined by the second terminal end when the tape is in the deployed state.

2. A deployable prop, as claimed in claim 1, wherein: the tape is a bistable tape.

3. A deployable prop, as claimed in claim 1, wherein: the foot member comprises a tape stabilizer for engaging the first terminal end of the tape and adapted to maintain the shape of the first terminal of the tape only when the tape is in a deployed state.

4. A deployable prop, as claimed in claim 1, wherein the cap has an interior side that engages the second terminal end of the tape, and wherein the interior side defines a groove that engages the second terminal end of the tape and is adapted to maintain the shape of the second terminal of the tape when at least the portion of the tape adjacent to the head member is in a deployed state.

5. A deployable prop, as claimed in claim 1, wherein wherein the partially cylindrical foot member surface has a foot member radius that is less than the inner radius of the tape in the undeployed state.

6. A deployable prop, as claimed in claim 1, wherein the partially cylindrical head member surface has a head member radius that is greater than the outer radius of the tape in the undeployed state.

7. A deployable prop, as claimed in claim 1, wherein: the tape is a bistable tape with one of the two stable states being the undeployed state characterized by the tape being disposed in an Archimedean spiral; and the head member includes a thumb tab that extends above an outermost winding of the tape when the tape is disposed in the Archimedean spiral and can be readily contacted by a user to lift the head member away from the outermost winding of the Archimedean spiral to initiate transition of the tape from the undeployed state to the deployed state.

8. A deployable prop, as claimed in claim 1, wherein: the head member comprises a thermoplastic elastomer.

9. A deployable prop, as claimed in claim 1, wherein: the head member comprises an adhesive tape with an adhesive interior side and a non-adhesive exterior side, the adhesive interior side located between the tape and the non-adhesive exterior side.

10. A deployable prop for use in supporting an object at a desired location adjacent to a vertically extending surface, comprising:
a tape that extends from a first terminal end to a second terminal end and between a first lateral edge and a second lateral edge that is substantially parallel to the first lateral edge;
wherein the tape has a deployed state and an undeployed state;
wherein, when the tape is in the undeployed state, the first lateral edge is separated from the second lateral edge by a first lateral edge distance over a substantial length of the tape, the first terminal end is separated from the second terminal end by a first terminal end distance, and the tape follows an Archimedean spiral with the first terminal end of the tape defining an interior end of the Archimedean spiral and the second terminal end of the tape defining an exterior end of the Archimedean spiral;
wherein, when the tape is in the deployed state, the first lateral edge is separated from the second lateral edge by a second lateral edge distance that is less than the first lateral edge distance over the substantial length of the tape, the first terminal end of the tape is separated from the second terminal end of the tape by a second terminal end distance that is greater than the first terminal end distance, the tape extends substantially linearly from the first terminal end to the second terminal end, and a transverse curve is established over the substantial length of the tape; and
a combination of both of (a) a foot member operatively attached adjacent to the first terminal end of the tape, the foot member comprising a partially cylindrical foot member surface adapted to engage a ground surface, wherein the foot member comprises an adhesive tape with an adhesive interior side and a non-adhesive exterior side, the adhesive interior side located between the tape and the non-adhesive exterior side, and (b) a head member operatively attached adjacent to the second terminal end of the tape, the head member comprising a partially cylindrical head member surface that is disposed immediately adjacent to a portion of the tape that is spaced from the second terminal end of the tape when the tape is in the Archimedean spiral associated with the undeployed state.

11. A deployable prop, as claimed in claim 10, wherein: the tape is a bistable tape.

12. A method for supporting an explosive adjacent to a vertically extending surface, comprising:
first providing a tape structure that includes a bistable tape that extends from a first terminal end to a second terminal end, the bistable tape having (a) a first stable state in which the bistable tape is substantially disposed in an Archimedean spiral in which the first terminal end is associated with an innermost winding of the Archimedean spiral and the second terminal end is associated with an outermost winding of the Archimedean spiral, (b) a second stable state in which the tape extends substantially linearly between the first and second terminal ends, and (c) an unstable state from which the bistable tape will self-deploy towards the second stable state, the unstable state characterized by a first portion of the bistable tape extending substantially linearly between the second terminal end and a point intermediate of the first and second terminal ends and a second portion of the bistable tape being disposed in the Archimedean spiral;
second providing the tape structure such that the bistable tape is not in the unstable state and at least a portion of the bistable tape is in an Archimedean spiral;
causing, following the step of second providing, the second terminal end of the bistable tape to be displaced away from the Archimedean spiral such that bistable tape is placed in the unstable state and self-deploys to the second stable state in which the bistable tape extends substantially linearly between the first and second terminal ends and has a transverse curve extending substantially from the first terminal end to the second terminal end;
disposing one of the first and second terminal ends of the deployed bistable tape adjacent to a first surface; and
disposing the other one of the first and second terminal ends of the deployed bistable tape adjacent to the explosive that is to be held adjacent to the vertically extending surface.

13. A method, as claimed in claim 12, wherein:
the tape structure includes a foot member for engaging the first surface.

14. A method, as claimed in claim 12, wherein:
the tape structure includes a head member for engaging the explosive.

15. A method, as claimed in claim 12, wherein:
the tape includes a first lateral edge and a second lateral edge that is substantially parallel to the first lateral edge; and
the tape structure includes a sheath that covers each of the first and second lateral edges.

16. A deployable prop as claimed in claim 10, further comprising:
a sheath covering substantial portions of the first and second lateral edges.

17. A deployable prop, as claimed in claim 16, wherein:
the sheath comprises one or a combination of: (a) an elastomer, (b) an adhesive, and (c) a fibrous material.

18. A deployable prop, as claimed in claim 17, further comprising:
a head member operatively attached adjacent to the second terminal end of the tape;
wherein at least one of the foot and head members comprises one or a combination of: (a) an elastomer, (b) an adhesive, and (c) a fibrous material.

19. A deployable prop, as claimed in claim 18, wherein:
at least one of the foot and head members has a greater thickness than the sheath.

* * * * *